(12) United States Patent
Lee et al.

(10) Patent No.: US 9,113,132 B2
(45) Date of Patent: Aug. 18, 2015

(54) SYSTEM AND METHODS FOR RECORDING A COMPRESSED VIDEO AND AUDIO STREAM

(75) Inventors: Alex Y. Lee, Scarborough (CA); Anthony C. Lam, Richmond Hill (CA); Andrew Ng, Markham (CA); Chakrit Nimmanant, Toronto (CA)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 159 days.

(21) Appl. No.: 12/501,975

(22) Filed: Jul. 13, 2009

(65) Prior Publication Data

US 2011/0008022 A1    Jan. 13, 2011

(51) Int. Cl.
| | | |
|---|---|---|
| *H04N 5/931* | (2006.01) | |
| *H04N 5/765* | (2006.01) | |
| *H04N 9/804* | (2006.01) | |
| *G11B 27/034* | (2006.01) | |
| *G11B 27/10* | (2006.01) | |
| *H04N 9/806* | (2006.01) | |
| *H04N 21/433* | (2011.01) | |
| *H04N 21/44* | (2011.01) | |
| *H04N 21/4402* | (2011.01) | |
| *H04N 7/15* | (2006.01) | |

(52) U.S. Cl.
CPC ............ *H04N 9/8042* (2013.01); *G11B 27/034* (2013.01); *G11B 27/10* (2013.01); *G11B 27/105* (2013.01); *H04N 9/8063* (2013.01); *H04N 21/4334* (2013.01); *H04N 21/4402* (2013.01); *H04N 21/44008* (2013.01); *H04N 7/155* (2013.01)

(58) Field of Classification Search
None
See application file for complete search history.

(56) References Cited

U.S. PATENT DOCUMENTS

| | | | | |
|---|---|---|---|---|
| 6,330,286 | B1 * | 12/2001 | Lyons et al. | 375/240.28 |
| 6,356,708 | B1 * | 3/2002 | Krause et al. | 386/329 |
| 2004/0244058 | A1 * | 12/2004 | Carlucci et al. | 725/135 |
| 2009/0103897 | A1 * | 4/2009 | Chen et al. | 386/104 |
| 2010/0248759 | A1 * | 9/2010 | Bettis et al. | 455/466 |

* cited by examiner

*Primary Examiner* — Heather Jones
(74) *Attorney, Agent, or Firm* — Christie, Parker & Hale, LLP

(57) ABSTRACT

A system for recording a compressed video-audio stream includes a decoder for decoding the video and audio packets of the stream, a multimedia recorder for recording the video and audio portions of the stream, and a video frame editor. In one embodiment the multimedia recorder receives and ignores initial delta frames of the video portion of the stream while buffering the audio portion of the stream received until a first key frame arrives and is buffered and decoded and wherein upon receiving a command to record, the system writes a copy of the key frame at a predefined interval the first interval corresponding with the start of the recording of the audio portions of the stream, the write interval repeated successively until a next key frame arrives whereby the video and audio is then recorded as received.

17 Claims, 5 Drawing Sheets

SYSTEM AND METHODS FOR RECORDING A COMPRESSED VIDEO AND AUDIO STREAM

BACKGROUND OF THE INVENTION

1. Field of the Invention

The present invention is in the field of digital video and audio recording and pertains particularly to methods and apparatus for recording live, compressed video and audio streams.

2. Discussion of the State of the Art

In the art of video and audio transmission, video and audio data are most often stored and transmitted in a compressed format to save bandwidth. A typical method of video compression Moving Pictures Experts Group (MPEG) involves storing and transmitting only some of the full data video frames of the video-audio stream. A full video frame may be referred to as a key frame known in MPEG compression format as an intra-coded pictures frame (I-frame). Delta frames are video frames that come before and after a key frame. Delta frames are known as predicted (P) frames and bidirectional (B) frames in the compression format that defines the I-frame. For example, in a scene where a car moves across a stationary background, only the car's movements will be stored in the delta frames. P frames generally follow an i-frame and contain only video data that has changed from the preceding i-frame. P-frames rely on the preceding i-frame for the rest of the video data. B frames contain only data that has changed from a preceding frame or data that is different from a next frame.

In some cases compressed video is streamed and recorded in real time. When recording starts, the recording system begins capturing video data including audio if any is present. A problem occurs in many cases where no key frame (i-frame) has been captured at the beginning of the recording process. As a result, the beginning of the recorded video cannot be rendered correctly because it is missing the full video data supplied by the key frame until the key frame arrives and is recorded. The delay in receiving a key frame may be as much as a few seconds where audio is heard but the video is blank or does not display correctly.

The inventor is aware of some proposed solutions to this problem such as snipping the first part of the video stream before the first key frame arrives. The audio must be snipped as well to preserve synchronization between the video and audio. A protocol has been proposed (IETF RFC 5168) that enables a recording system to request that a key frame be sent first by the device generating the video. A problem with this solution is that the sender of the video must implement the protocol, which is not supported by most of the recording systems.

Therefore, what is clearly needed is a system and method for recording compressed video streamed live that solves the problems mentioned above.

SUMMARY OF THE INVENTION

The problem stated above is that when recording a live video and audio stream the first portion of the recording has insufficient video data because only delta frames arrive at the recording system before a first key frame, which holds most of the video data. Known means for addressing this issue have had undesirable side effects.

The inventors therefore considered functional elements of a data recording system looking for elements that that could potentially be harnessed to provide a universally supported method for providing sufficient video data at the beginning of a video stream but in a manner that would not create drag redundancy or new requirements for protocol adoption.

The present inventor realized in an inventive moment that if, at the point of recording, a key video frame could be made available to a recording system at the beginning of the recording process, significant improvement in quality of the initial portion of a recorded video and audio stream might result. The inventor therefore constructed a unique video recording system for real time recording of live video and audio that allowed rich video data to be made available at the beginning of the stream before recording has started. A significant quality improvement results at playback of the recorded video and audio stream.

Accordingly, in an embodiment of the present invention, a system for recording a compressed video-audio stream is provided and includes a decoder for decoding the video and audio packets of the stream, a multimedia recorder for recording the video and audio portions of the stream, and a video frame editor. In one embodiment the multimedia recorder receives and ignores initial delta frames of the video portion of the stream while buffering the audio portion of the stream received until a first key frame arrives and is buffered and decoded and wherein upon receiving a command to record, the system writes a copy of the key frame at a predefined interval the first interval corresponding with the start of the recording of the audio portion of the stream, the write interval repeated until a next key frame arrives whereby the video and audio is then recorded as received.

In one embodiment the system is used for capturing voice mail messages from network users. In another embodiment the system is used for capturing interactive voice and video responses from an internet protocol-based interactive voice response system enhanced for video. In one embodiment the audio stream is decoupled from the video stream and buffered for some period of time before the first video key frame arrives. In one embodiment the delta frames are predicted (P) frames and the key frame is an intra (I) frame. In another embodiment the delta frames include bidirectional (B) frames.

According to another embodiment of the present invention in a system for recording a compressed video-audio stream, a method for providing key frame data at the beginning of a recording of the video-audio stream is provided and includes the steps (a) receiving video and audio packets of the video-audio stream and buffering the audio data, (b) receiving, decoding, and buffering a first key frame received of the video portion of the video-audio stream, and (c) upon receiving a command to record, writing a copy of the first key frame at a predefined interval the first interval corresponding to the beginning of the audio stream.

In one aspect of the method in step (a) the audio stream is decoupled from the video stream. In one aspect the delta frames include predicted (P) frames. In one aspect the delta frames include bidirectional (B) frames. In one aspect in step (b) the key frame is an intra (I) frame.

According to another embodiment of the present invention, a system is provided for recording a compressed video and audio stream. The system includes a decoder for decoding the video and audio stream, a multimedia recorder for capturing the video and audio portions of the stream, and a video frame editor. In one embodiment the multimedia recorder delays writing of the video data until a first key frame arrives, which upon receiving a command to record, is reassigned by way of the video frame editor as a starting key frame for the video stream corresponding to the beginning of the audio stream and wherein delta frames reflecting zero change of video content are generated by the video frame editor to follow the key frame at predefined intervals from the starting key frame until the next key frame arrives.

In one embodiment the system is used for capturing voice mail messages from network users. The system is used for capturing interactive voice and video responses from an internet protocol-based interactive voice response system enhanced for video. In one embodiment the audio stream is decoupled from the video stream and buffered for some period of time before the first video key frame arrives.

In one embodiment the delta frames are predicted (P) frames and the key frame is an intra (I) frame. In one embodiment the delta frames include bidirectional (B) frames. In another embodiment a next key frame arriving is replaced by a zero change delta frame.

According to another embodiment of the invention in a system for recording a compressed video-audio stream, a method for providing key frame data at the beginning of a recording of the video-audio stream is provided and includes the steps (a) receiving video and audio packets of the video-audio stream and buffering the audio data, (b) receiving, decoding, and buffering a first key frame received of the video portion of the video-audio stream, (c) upon receiving a command to record, reassigning the first key frame received as a starting key frame for the video stream corresponding to the beginning of the audio stream, and (d) generating delta frames reflecting zero change of video content and writing the delta frames following the key frame at predefined intervals until the next key frame arrives. In one embodiment the audio stream is decoupled from the video stream.

BRIEF DESCRIPTION OF THE DRAWING FIGURES

DETAILED DESCRIPTION

The inventors provide a system and methods for real time recording of a compressed live video or video-audio stream that allows the recorded video to be played back correctly from the very beginning of the recording. The present invention is described in enabling detail below according to the following examples, which may represent one or more embodiments of the present invention.

Figure 1:
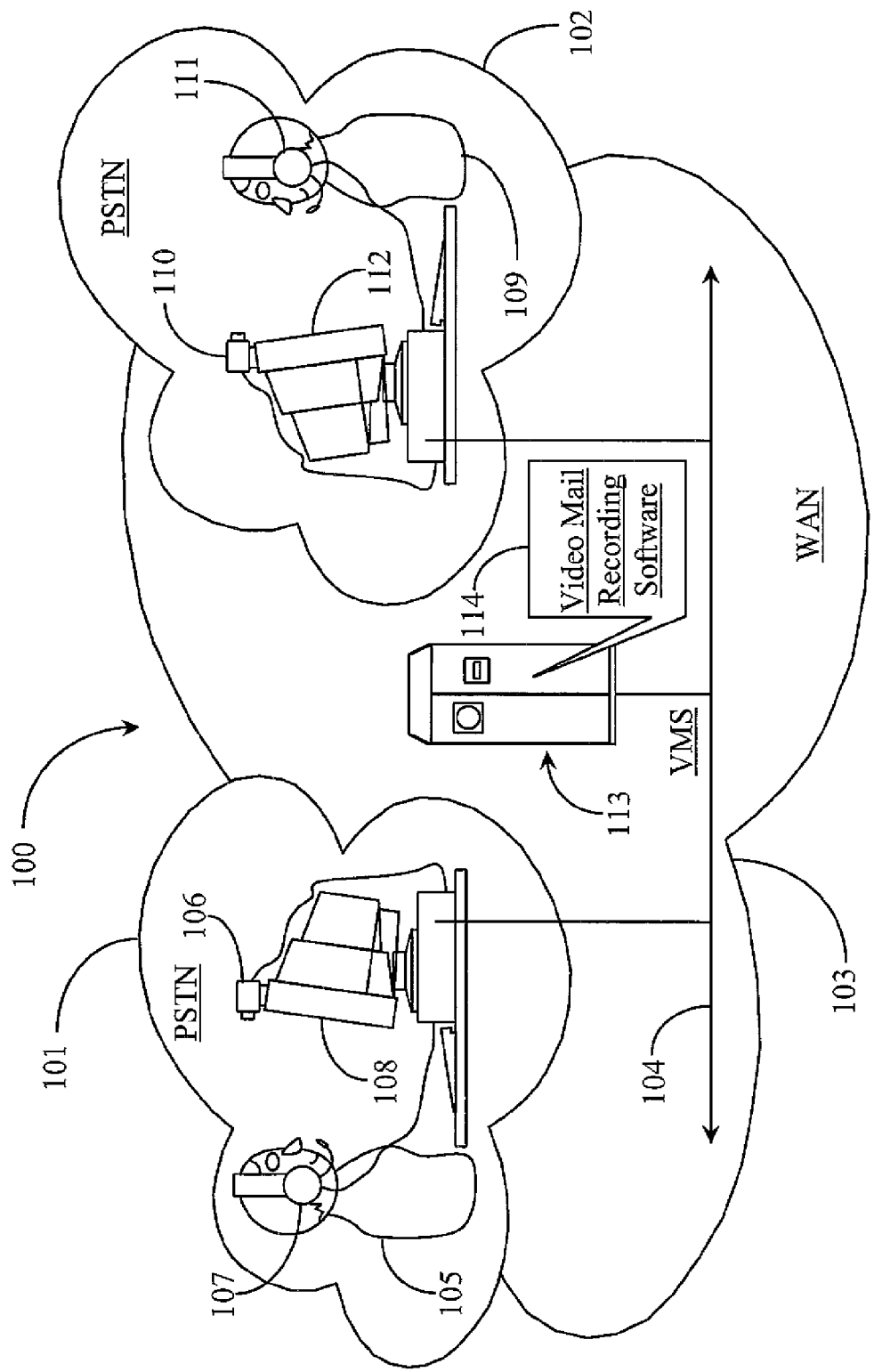
FIG. 1 is a network overview of a system for recording live video and audio according to an embodiment of the present invention.

FIG. 1 is a network overview of a system 113 for recording live video or video-audio according to an embodiment of the present invention. A communications network 100 is illustrated in this example and includes a local public switched telephone network (PSTN) segment 101, a local PSTN segment 102, and a wide-area-network (WAN) 103, which is also represented herein by a WAN backbone 104. In one embodiment WAN 103 is a private or corporate WAN. In one embodiment of the invention, WAN 103 is the Internet network. In this embodiment backbone 104 represents all of the lines, equipment, and access points that make up the Internet network as a whole including connected sub-networks. Therefore, there are no geographic limitations on practicing the present invention.

One example where real time recording of video-audio streams may occur according to an embodiment of the present invention is in a voice mail server (VMS) such as VMS 113. VMS 113 is adapted with an accessible digital storage medium to store software (SW) and data and to execute mail applications relevant to serving recorded voice mail messages to clients of the server. VMS 113 has connection to WAN backbone 104 for network access by client devices adapted to receive video mail.

A user 105 operating a personal computer 108 is illustrated within PSTN segment 101 and represents a client of server 113 that may send or receive video mails. User 105 has a headset 107 adapted with a microphone for generating the audio portion of a video-audio stream that comprises a video mail. A camera 106 is illustrated in this example and is adapted to generate the video portion of the video-audio stream.

A user 109 operating a personal computer 112 is illustrated within PSTN segment 102 and represents a client of server 113 that may send and receive video mails. User 109 has a headset 111 adapted with a microphone for generating the audio portion of a video-audio stream that comprises a video mail. A camera 106 is illustrated in this example and is adapted to generate the video portion of the video-audio stream.

It is noted herein that client software (SW) such as a mail program enhanced for video mail is presumed installed on both computers 108 and 112. Computers 108 and 112 may be enhanced for video telephony using the appropriate client SW which is widely available. In one embodiment users 105 and user 109 may operate dedicated video telephones instead of personal computers enhanced for video mail and or video telephony.

Computer 108 and computer 112 are connected to WAN backbone 104 by network access lines, typically through a network service provider like an Internet service provider (ISP) in the case of the Internet. User 105 or user 109 may initiate a video-audio stream, which is uploaded to network 103 and ultimately to VMS 113. VMS 113 contains video mail recording software (SW) 114, which is provided for the purpose of recording video mails initiated by clients of the service. It is presumed in this example that the system enables compression of the live video-audio using a standard format such as MPEG.

SW 114 allows the system to record live message streams for later placement in appropriate inbox destinations of an intended recipient(s). Without the system of the invention video mails played back by recipients contain a black or blank video display while the first few seconds of audio are heard. When a first key frame is played by the playback SW or device, the video is then viewable and the audio is synchronized with the rest of the video. Recording SW 114 is enhanced with a capability of recording a live compressed video-audio stream to enable a full video screen shot of the sender in the very first video frame recorded. SW 114 is enabled by a built in algorithm that allows a delay in writing of the video data during the recording process until a key frame arrives to provide the rich video data required to support a full multimedia view of the sender of the video mail.

The system of the invention is not limited to implementation in a video mail application. The system of the invention can be practiced in any system that records live compressed video streams or video-audio streams. More detail about the recording system of the present invention is provided further below.

Figure 2:
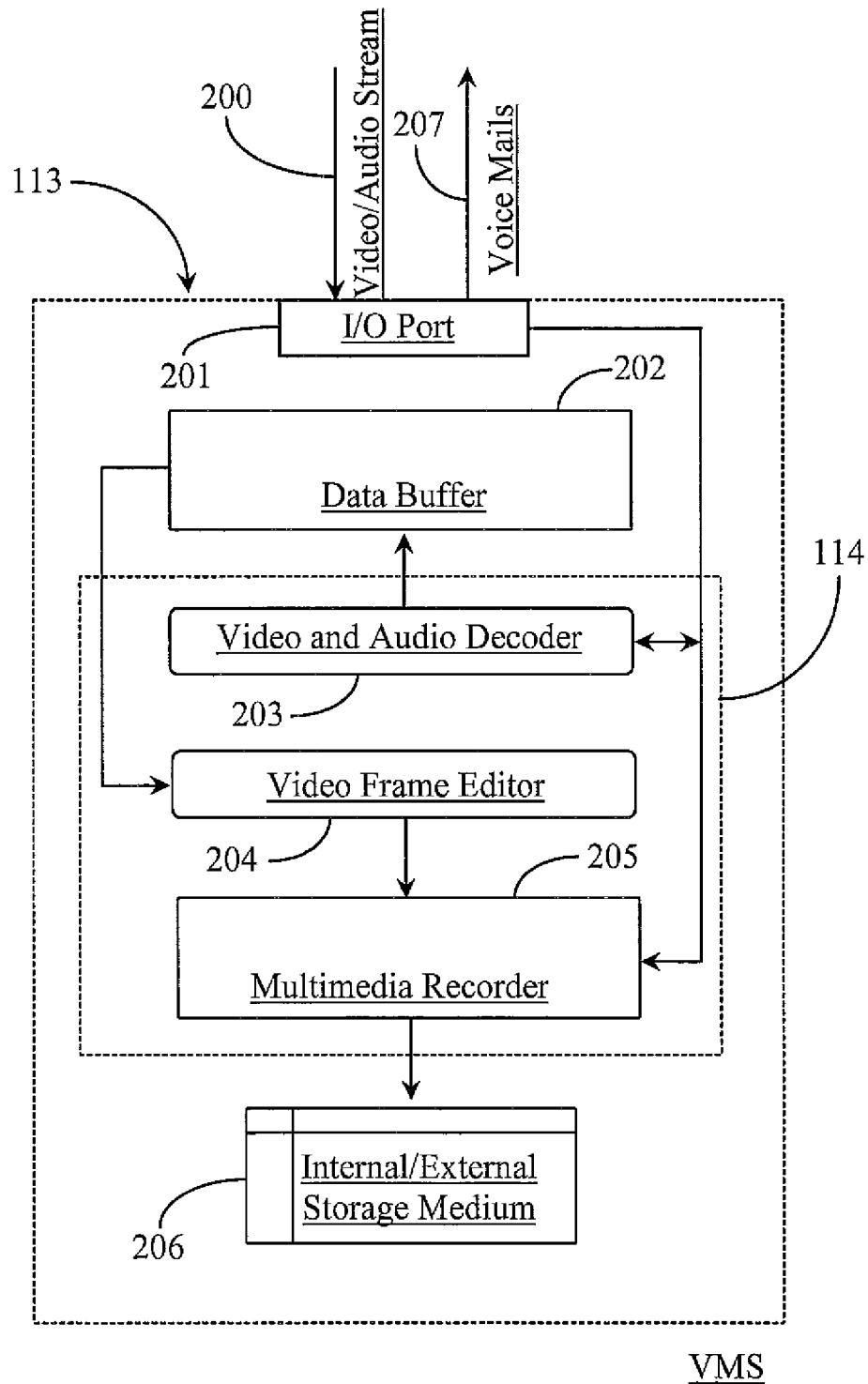
FIG. 2 is a block diagram illustrating video and audio recording and editing components according to an embodiment of the present invention.

FIG. 2 is a block diagram illustrating video and audio recording and editing components of VMS 113 according to an embodiment of the present invention. VMS 113 accepts live compressed video-audio streams 200 from clients of the system through an input/output (I/O) port 201. SW 114 includes a video-audio decoder 203 for decoding the compressed video-audio data. In one embodiment of the present invention video-audio data incoming through port 201 is first decoded by SW 114 decoder 203. Decoded video and audio data may then be buffered in a data buffer 202. Decoder 203 may be adapted to work with many different codecs. Decryption may also be a part of the decoding process.

In this example video data received as delta frames are ignored and are not buffered in data buffer 202 prior to recording until a key frame arrives that holds all of the video data supporting a full multimedia view of the sender of the video mail stream. Video frame editor 204 is part of SW 114 and is adapted to enable copying of video data from a first key frame arriving at the recording system. The copied key frame data may be rendered a series of key frames corresponding generally to the ignored delta frames of the video stream. Video frame editor 204 may also enable video frame header manipulation for the purpose of altering or removing time stamp information and other data typically found in video frame headers.

Video frame editor 204 provides a copy of the first received key frame captured from the video stream in order to reflect the full video data in the first frame and in subsequent frames before a next key frame of the video stream arrives. In this way all of the video data held in the first key frame is visible at the beginning of the audio data after recording has started. Only the first key frame of the video stream is buffered and decoded. In this embodiment all delta frames received prior to the first key frame of the video stream are completely ignored by the system. After multimedia recording has started and a next real key frame arrives, further frames of the video-audio stream (video and audio) are decoded and recorded as received without a requirement for buffering the data. In a preferred embodiment audio data received before the first video key frame is buffered so that when multimedia recording starts, the audio and manipulated video are in sync with one another.

In another embodiment of the present invention video frame editor 204 is enhanced to assign the first key frame received and decoded as the first frame of the recording. In this embodiment the delta frames received before the first key frame are ignored and delta frames reflecting zero change in video content are generated to follow the starting key frame at predefined intervals consistent with the standard frame intervals of a video stream. The interval period may vary somewhat according to user preference as long as each frame causes the full video data in the starting key frame to be displayed for the receiver of the video mail message. This effect is essentially the same as the first embodiment except that the key-frame need not be repeated at subsequent frame intervals until a next key frame arrives. In a variation to this embodiment the next key frame that arrives may be replaced with a zero change delta frame.

In one embodiment video data (first key frame) received at I/O port 201 is buffered before decoding and recording. In another embodiment the data is first decoded and then buffered. It is noted that in a preferred embodiment any delta frames received by the recording system from the video stream before the first key frame has arrived are ignored and not decoded or buffered. The system looks for the first key frame of the stream, which has the rich video content required to fill a video display.

Recorded video-audio files comprising Video mails in this example may be stored internally or externally in a storage medium 206. Storage medium 206 may represent the storage space allotted to clients for mail storage. Video mail files are served, in this case, through output port 201 upon request (download). In one embodiment the mail server is an instant message application protocol (IMAP) server where clients access the server to view mail but do not utilize a desktop application to download content.

SW 114 including components 203-205 may be provided to other types of video-audio enabled systems without departing from the spirit and scope of the present invention. The illustration of a video mail server as a recording system in this example is exemplary only and is not to be viewed as a limitation of the present invention. The recording system may be an internet protocol (IP) based interactive voice response (IVR) system that records interactions for quality management and historical archiving. The present invention may be used unmodified in an IVR system or in a video conferencing system without departing from the spirit and scope of the present invention. The present invention may be implemented unmodified in any instant messaging (IM) application that supports live video/voice interaction.

Figure 3:
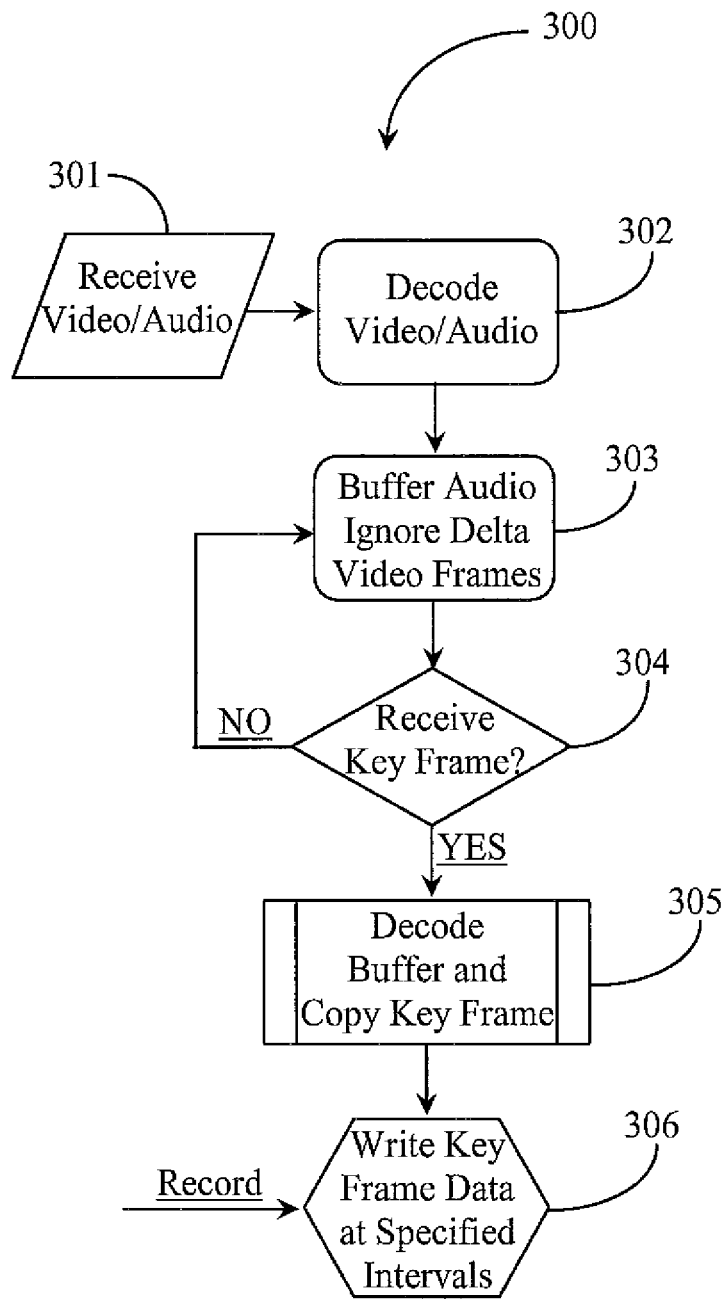
FIG. 3 is a process flow chart illustrating steps 300 for recording a compressed live video-audio stream according to an embodiment of the present invention.

FIG. 3 is a process flow chart illustrating steps 300 for recording a compressed live video-audio stream according to an embodiment of the present invention. At step 301 a video-audio stream is received by a video-audio recording system. The system may be a video mail server, an IP-IVR platform, or some other system enhanced for recording live video and audio.

Video and audio of the stream may be decoded at step 302. Decoded delta frames may be ignored and may not be buffered in a preferred embodiment. At step 303 the system buffers the audio data received and in this example ignores any video data that is not the first key frame of the video portion of the stream. At step 304 the system determines if it has received a key frame associated with the video-audio stream being buffered. If the system has not received a key frame at step 304, the process loops back to step 303 continuing to buffer incoming audio data.

If the system determines a key frame has arrived in step 304, it is decoded, buffered, and copied at step 305. The system may not buffer any more data from the stream for any appreciable amount of time after the initial key frame of the incoming stream has been detected. It is presumed in this example that a record command is received at some point before actual multimedia recording begins. This command is illustrated at left of process step 306. The system, upon receiving the command record, may write the key frame copied at step 305 at specified intervals corresponding to the beginning of the audio stream at step 306 while recording commences. Subsequent audio and video data received after the first key frame can be decoded and forwarded directly to the multimedia recorder for recording in real time without being buffered for any length of time although buffering the data temporarily before recording may be an option without departing from the spirit and scope of the present invention.

Figure 4:
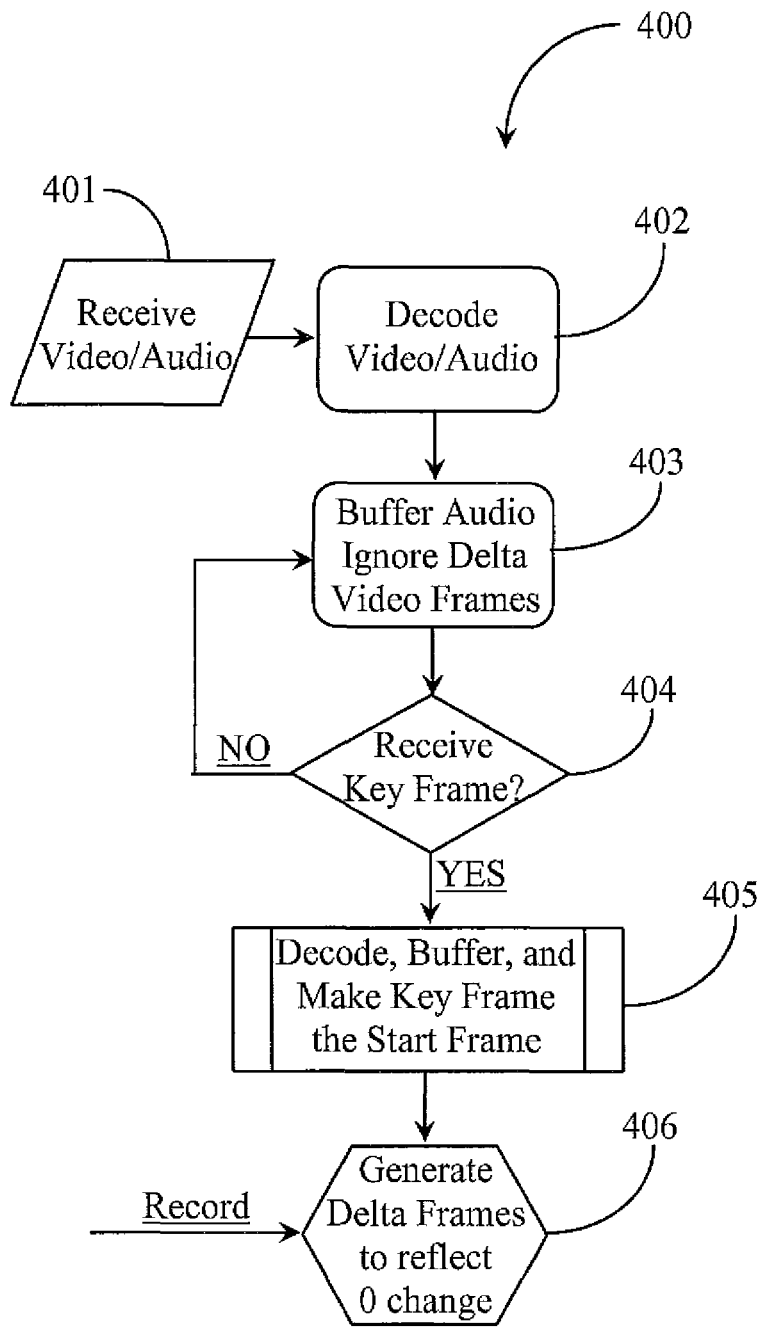
FIG. 4 is a process flow chart illustrating steps 400 for recording a compressed live video-audio stream according to another embodiment of the present invention.

FIG. 4 is a process flow chart illustrating steps 400 for recording a compressed live video-audio stream according to another embodiment of the present invention. At step 401 a video-audio stream is received by a video-audio recording system. The system may be a video mail server, an IP-IVR platform, or some other system enhanced for recording live video and audio as described further above.

Video and audio of the stream is decoded at step 402. At step 403 the system buffers the audio packets received and ignores the initial video packets received until the first key frame arrives. At step 404 the system determines if it has received a key frame associated with the video-audio stream being buffered. If the system has not received a key frame at step 404, the process loops back to step 403 continuing to buffer incoming audio data.

If the system detects the first received key frame at step 404, then the key frame is decoded, buffered, and assigned as the starting frame of the video portion of the audio-video stream at step 405. The frame may be assigned as the starting frame using the video frame editor. In this case key frame does not require any reproduction. At some point the system may receive a command to record the video-audio stream. This command is illustrated at the left of process step 405. At step 406 the system aided by the video frame editor generates delta frames that reflect a zero change from the now starting key frame. In a variation of this embodiment the next key frame that arrives may also be replaced by a zero-change delta frame. Subsequent video frames received can be decoded and forwarded directly to the multimedia recorder for recording.

In one embodiment of the present invention for both processes of FIG. 3 and of FIG. 4, the initial video packets received are decoded and buffered along with the first audio frames. In this case for the process of FIG. 3 the copied key frame data is inserted into the buffered delta frames making them key frames. For the process of FIG. 4, the initial key frame is made the starting frame and the buffered delta frames are edited to reflect a zero change from the new start frame.

The options of replicating a key frame at specified intervals or of filling in the buffered delta frames with the key frame data (FIG. 3) are interchangeable and may be performed automatically in real time as recording commences. The only requirement is that the key frame has arrived before recording begins. The command to record may be a default step in the process depending on the use case scenario. The options of generating new delta frames to reflect a zero change in video content behind a key frame that is assigned as a starting key frame or editing the buffered delta frames to follow the new starting frame as zero change frames depending on the starting key frame for data are interchangeable and may be performed automatically in real time as recording commences. A preference for replacing the initial delta frames ignored by the system or editing those frames according to new requirements may depend on the efficiency of those processes. Such preferences may vary from system to system in different embodiments.

It is noted herein as well that transmission of audio and video data of a video-audio stream may be conducted over an IP-based network using data packetizing techniques known in the art wherein the video frames are reconstructed at the receiving end. In some cases the frame structure of the video stream may be preserved during transport of the stream over a supporting network.

Figure 5:
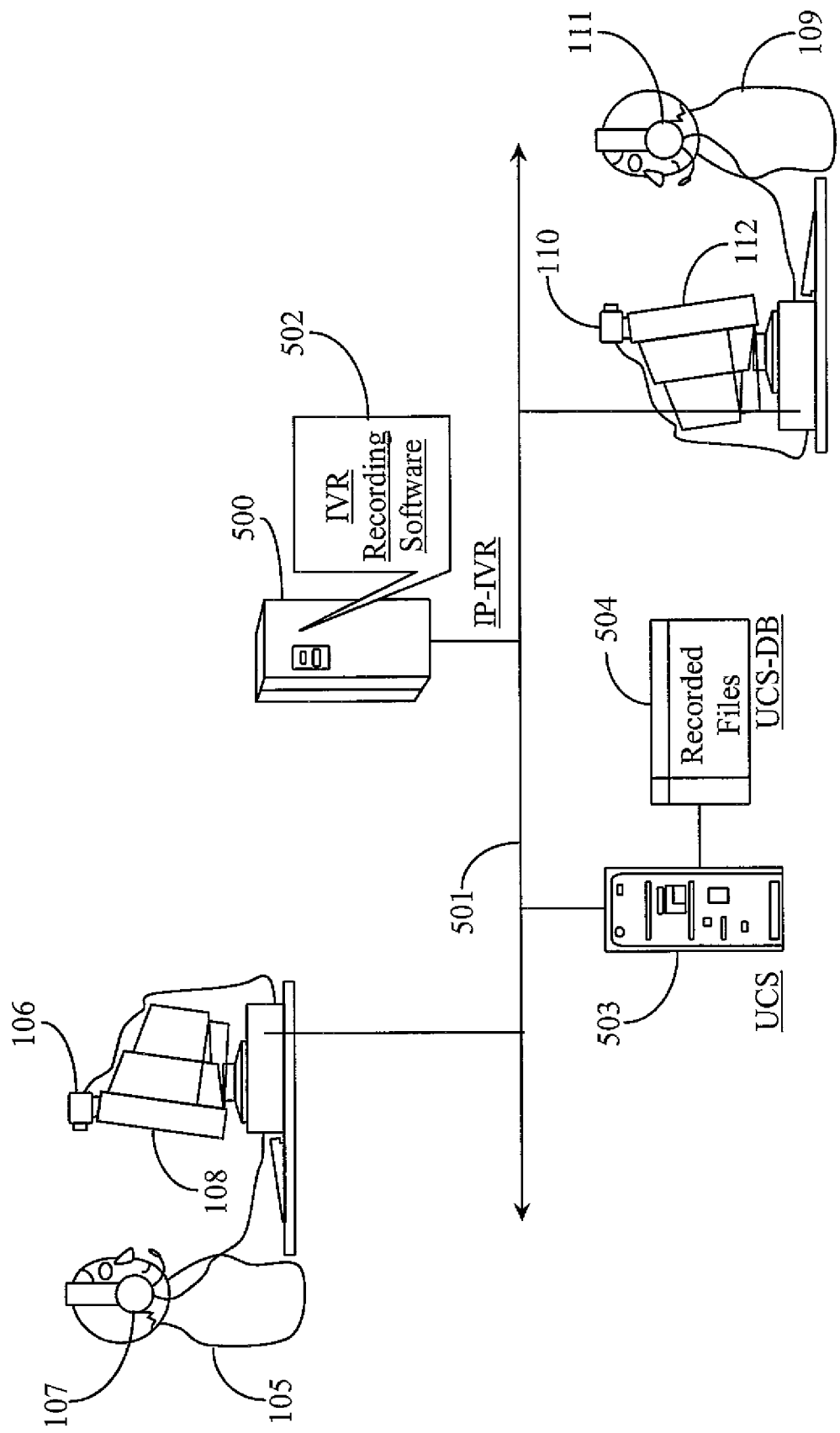
FIG. 5 is a network overview of a system for recording live video and audio according to another embodiment of the present invention.

FIG. 5 is a network overview of a system for recording live video and audio according to another embodiment of the present invention. User 109 and user 105 are illustrated in this example operating personal computers 112 and 108 respectively. User 109 is wearing headset 111 and using video camera 110 while user 105 is wearing headset 107 and using video camera 106. Both users' personal computers are connected to an Internet Protocol (IP) network illustrated herein by a network backbone 501. Backbone 501 is an Internet network backbone in one embodiment. In this embodiment backbone 501 represents all of the lines, equipment and access points making up the Internet network as a whole. Therefore there are no geographic limits to the practice of the invention in an IP-based network environment. It is noted herein that video and audio data is packetized for transport over an IP network using realtime transport protocol (RTP) or a similar transport protocol suitable for live streaming video-audio. In one embodiment network 501 is a LAN connected to an Internet network and enhanced for transfer control protocol over Internet protocol (TCP/IP).

An IP-based IVR system or platform 500 is provided on network 501 and is adapted to interact with video/voice callers represented by users 105 and 109. System 500 has a digital medium accessible thereto for storing voice applications and for storing an executable version of IVR recording software (SW) 502. SW 502 is adapted to record live compressed video and audio from users interacting with the system such as user 105 and user 109. In one embodiment recorded interactions between users and the system are forwarded to a universal contact server (UCS) 503 connected to the network. UCS 503 is adapted to monitor and archive records of interaction including recordings made at IVR 500 using SW 502. SW 502 is analogous to SW 114 described in FIG. 1 and FIG. 2.

UCS 503 may be connected directly to IVR system 500 in one embodiment and SW 502 may reside on UCS 503. UCS 503 has a data connection to a UCS database 504 adapted for storing recorded interactions including recorded video and audio interactions made using SW 502. The recording system of the present invention may be implemented at any network-based end point system that records live compressed video or video-audio streams. In one embodiment of the present invention the recording system is implemented in an IP-based IVR system. In another embodiment the recording system is implemented in a video mail system. In another embodiment the recording system is implemented in a video conference bridge system. In still another embodiment the system is implemented in a contact server that monitors live interactions.

In a preferred embodiment to minimize buffering requirements all initial delta frames of the video portion of the video-audio stream are ignored by the recording system while the audio is buffered. In this case only the first video key frame that contains the rich video data required to fill the display is buffered. Key frame replication or key frame reassignment followed by delta frame generation occurs in real time after recording is undertaken by the system. In both embodiments when a next key frame is received by the recording system the subsequent video and audio data received may be recorded in real time without reliance on buffering or any video frame editing. However, there may be some embodiments where buffering of all of the incoming data is performed by default even after the second key frame is received by the system and recording has started.

It will be apparent to one with skill in the art that the recording system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A method for recording a video-audio stream transmitted for a video voice mail, comprising:

receiving, by a computer processor, live video packets and live audio packets, the live video packets comprising a reference frame and a dependent frame, and the live audio packets corresponding to each frame of the video packets;

identifying, by the computer processor, each video frame of the received video packets as the reference frame or the dependent frame;

in response to identifying a first video frame as the dependent frame before identifying a second video frame as the reference frame, discarding, by the computer processor, the identified first video frame and buffering a first audio packet selected from the received audio packets, wherein the buffered first audio packet is synchronized to the discarded first video frame; and in response to identifying the second video frame as the reference frame after identifying the first video frame as the dependent frame:

buffering, by the computer processor, the identified reference frame, wherein the buffered reference frame is synchronized to a second audio packet selected from the received audio packets;

generating, by the computer processor, a copy of the identified reference frame;

recording, by the computer processor, the generated copy of the reference frame in association with the buffered first audio packet; and recording, by the computer processor, the identified reference frame in association with the second audio packet.

2. The method of claim 1, wherein the reference frame is a key frame and the dependent frame is a delta frame.

3. The method of claim 2, wherein the key frame comprises I-frames and the delta frame comprises P-frames or B-frames.

4. The method of claim 1, further comprising recording, by the computer processor, video packets received after the identification of the reference frame in association with the corresponding audio packets.

5. The method of claim 1, wherein the audio packets comprise voice mail messages.

6. The method of claim 1, wherein the video-audio stream is an interactive voice and video response from an interne protocol-based interactive voice response system.

7. The method of claim 1, wherein the video-audio stream is received by a multimedia recorder for recording the video-audio stream, the multimedia recording comprising a decoder for decoding the received video packets and the audio packets.

8. The method of claim 1, wherein the generated copy of the reference frame associated with the buffered first audio packet, and the identified reference frame with the corresponding second audio packet, are stored in a video mail server.

9. The method of claim 1, wherein the generated copy of the reference frame is recorded in association with the buffered first audio packet, in a secondary storage device.

10. A system for recording a video-audio stream transmitted for a video voice mail, comprising:

a processor; and a memory, wherein the memory has stored thereon instructions that, when executed by the processor, causes the processor to:

receive live video packets and live audio packets, the live video packets comprising a reference frame and a dependent frame, and the live audio packets corresponding to each frame of the video packets;

identify each video frame of the received video packets as the reference frame or the dependent frame;

in response to identifying a first video frame as the dependent frame before identifying a second video frame as the reference frame, discarding the identified first video frame and buffer a first audio packet selected from the received audio packets, wherein the buffered first audio packet is synchronized to the discarded first video frame; and in response to identifying the second video frame as the reference frame after identifying the first video frame as the dependent frame:

buffer the identified reference frame, wherein the buffered reference frame is synchronized to a second audio packet selected from the received audio packets;

generate a copy of the identified reference frame;

record the generated copy of the reference frame in association with the buffered first audio packet; and record the identified reference frame in association with the second audio packet.

11. The system of claim 10, wherein the reference frame is a key frame and the dependent frame is a delta frame.

12. The system of claim 11, wherein the key frame comprises I-frames and the delta frame comprises P-frames or B-frames.

13. The system of claim 10, where the memory has stored thereon instructions that, when executed by the processor, further causes the processor to record the video packets received after the identification of the reference frame in association with the corresponding audio packets.

14. The system of claim 10, wherein the audio packets comprise voice mail messages.

15. The system of claim 10, wherein the video-audio stream is an interactive voice and video response from an interne protocol-based interactive voice response system.

16. The system of claim 10, further comprising a multimedia recorder for recording the video-audio stream, the multimedia recorder including a decoder for decoding the received video packets and audio packets.

17. The system of claim 10, further comprising a video mail server configured to store the generated copy of the reference frame associated with the buffered first audio packet, and the identified reference frame with the corresponding second audio packet.

* * * * *